US008290929B2

(12) United States Patent
Fisher et al.

(10) Patent No.: US 8,290,929 B2
(45) Date of Patent: Oct. 16, 2012

(54) MEDIA ENHANCEMENT MECHANISM USING EMBED CODE

(75) Inventors: Roberto Warren Fisher, Los Angeles, CA (US); Chris Kalaboukis, Los Gatos, CA (US); Ronald Martinez, San Francisco, CA (US); Ian C. Rogers, Santa Monica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1109 days.

(21) Appl. No.: 11/925,280

(22) Filed: Oct. 26, 2007

(65) Prior Publication Data

US 2009/0112839 A1     Apr. 30, 2009

(51) Int. Cl.
*G06F 17/30* (2006.01)

(52) U.S. Cl. ........................................ 707/712
(58) Field of Classification Search .......................... None
See application file for complete search history.

(56) References Cited

U.S. PATENT DOCUMENTS

| | | | | |
|---|---|---|---|---|
| 5,682,540 A * | 10/1997 | Klotz et al. | | 715/209 |
| 5,708,825 A * | 1/1998 | Sotomayor | | 715/205 |
| 5,949,419 A * | 9/1999 | Domine et al. | | 715/744 |
| 5,958,013 A * | 9/1999 | King et al. | | 709/227 |
| 5,964,836 A * | 10/1999 | Rowe et al. | | 709/221 |
| 5,983,176 A * | 11/1999 | Hoffert et al. | | 704/233 |
| 6,035,323 A * | 3/2000 | Narayen et al. | | 709/201 |
| 6,081,262 A * | 6/2000 | Gill et al. | | 715/202 |
| 6,112,233 A * | 8/2000 | Xu | | 709/217 |
| 6,145,000 A * | 11/2000 | Stuckman et al. | | 709/219 |
| 6,157,392 A * | 12/2000 | McKeeth | | 345/473 |
| 6,219,069 B1 * | 4/2001 | McKeeth | | 345/473 |
| 6,311,194 B1 * | 10/2001 | Sheth et al. | | 715/236 |
| 6,332,154 B2 * | 12/2001 | Beck et al. | | 709/204 |
| 6,368,476 B1 * | 4/2002 | DeMarinis et al. | | 204/284 |
| 7,200,586 B1 * | 4/2007 | Deguchi et al. | | 1/1 |
| 7,279,629 B2 * | 10/2007 | Hinman et al. | | 84/615 |
| 7,617,511 B2 * | 11/2009 | Marsh | | 725/45 |
| 7,783,624 B2 * | 8/2010 | Martinez et al. | | 707/709 |
| 7,899,808 B2 * | 3/2011 | Fisher et al. | | 707/712 |
| 8,108,488 B2 * | 1/2012 | Derechin et al. | | 709/219 |
| 8,145,727 B2 * | 3/2012 | Fisher et al. | | 709/219 |
| 2001/0049635 A1 * | 12/2001 | Chung | | 705/26 |
| 2002/0023013 A1 * | 2/2002 | Hughes et al. | | 705/26 |
| 2002/0023014 A1 * | 2/2002 | Hughes et al. | | 705/26 |
| 2002/0078093 A1 * | 6/2002 | Samaniego et al. | | 707/513 |
| 2002/0091762 A1 * | 7/2002 | Sohn et al. | | 709/203 |
| 2002/0138564 A1 * | 9/2002 | Treptow et al. | | 709/203 |
| 2003/0095791 A1 * | 5/2003 | Barton et al. | | 386/83 |

(Continued)

OTHER PUBLICATIONS

Wang, Yanming, "An Embedded Tree Data Model for Web Content Adaptation," Oct. 2004, Master of Applied Science Thesis, pp. 1-99, Department of Electrical and Computer Engineering, University of British Columbia, Canada.*

*Primary Examiner* — Farhan Syed

(74) *Attorney, Agent, or Firm* — James J. DeCarlo; Greenberg Traurig, LLP

(57) ABSTRACT

A method to provide additional media objects for data objects containing one or more existing media objects is described. The existing media object is analyzed to determine additional related media available on the network, and the data object description is augmented with metadata to identify the additional media in an enhanced data object description. When the enhanced data object is rendered, the metadata facilitates incorporation of additional media objects in the displayed page.

20 Claims, 10 Drawing Sheets

U.S. PATENT DOCUMENTS

| | | |
|---|---|---|
| 2003/0103645 A1* | 6/2003 | Levy et al. .................... 382/100 |
| 2003/0233349 A1* | 12/2003 | Stern et al. ........................ 707/3 |
| 2004/0030681 A1* | 2/2004 | Shannon et al. .................. 707/3 |
| 2005/0015722 A1* | 1/2005 | Niyogi et al. ................. 715/517 |
| 2005/0120868 A1* | 6/2005 | Hinman et al. ................. 84/615 |
| 2005/0138546 A1* | 6/2005 | AbiEzzi ....................... 715/513 |
| 2005/0193094 A1* | 9/2005 | Robbin et al. ................. 709/219 |
| 2005/0229227 A1* | 10/2005 | Rogers .......................... 725/115 |
| 2006/0015810 A1* | 1/2006 | Calvert et al. ................. 715/517 |
| 2006/0037051 A1* | 2/2006 | McDowell et al. ............. 725/80 |
| 2007/0168256 A1* | 7/2007 | Horstmann ..................... 705/14 |
| 2007/0220083 A1* | 9/2007 | Kothari et al. ................. 709/203 |
| 2007/0239537 A1* | 10/2007 | Protheroe et al. ............. 705/14 |
| 2008/0082405 A1* | 4/2008 | Martinez et al. ................ 705/14 |
| 2008/0082904 A1* | 4/2008 | Martinez et al. .............. 715/205 |
| 2008/0082905 A1* | 4/2008 | Martinez et al. .............. 715/205 |
| 2008/0222199 A1* | 9/2008 | Tiu et al. ..................... 707/104.1 |
| 2008/0281793 A1* | 11/2008 | Mathur ............................. 707/3 |
| 2009/0006192 A1* | 1/2009 | Martinez et al. ................ 705/14 |
| 2009/0063973 A1* | 3/2009 | Payton .......................... 715/716 |
| 2009/0070392 A1* | 3/2009 | Le Roy et al. ................ 707/203 |
| 2009/0112839 A1* | 4/2009 | Fisher et al. ..................... 707/5 |
| 2009/0112874 A1* | 4/2009 | Fisher et al. .................... 707/10 |
| 2009/0113301 A1* | 4/2009 | Fisher et al. .................. 715/716 |
| 2009/0113315 A1* | 4/2009 | Fisher et al. .................. 715/758 |
| 2009/0138330 A1* | 5/2009 | Higgins .......................... 705/10 |
| 2009/0144328 A1* | 6/2009 | Martinez et al. ........... 707/104.1 |
| 2010/0070862 A1* | 3/2010 | Partovi et al. ................. 715/716 |
| 2010/0094671 A1* | 4/2010 | Oaks et al. ......................... 705/7 |
| 2010/0106564 A1* | 4/2010 | Manesh et al. .................. 705/10 |
| 2010/0241497 A1* | 9/2010 | Rittman et al. ............. 705/14.5 |
| 2011/0225506 A1* | 9/2011 | Casalaina et al. ............. 715/741 |

* cited by examiner

```
<script language = "JavaScript" type= "text/javascript">
<!--
ctxt_cee_id = "ceeid";
ctxt_ad_width = 728;
ctxt_ad_height = 90;
ctxt_tag1 = "eucalyptus";
ctxt_objectPref = audio;
//-->
</script>
<script language= "JavaScript" src= "http://ypn-js.yahoo.com/js/enhancer.js">
</script>
```

Fig. 5

MEDIA ENHANCEMENT MECHANISM USING EMBED CODE

TECHNICAL FIELD

The present disclosure relates generally to creation, distribution, and consumption of multimedia content over interactive networks.

BACKGROUND

Users communicating over a network typically use a physical device, such as a cell phone, a personal digital assistant (PDA), a smart phone, a networked music/video player, a personal computer, or a public terminal, to interconnect and share information with other users on the network. These networked devices provide an increased ability to compose and consume information, and to interact socially through the sharing of information. This disclosure relates generally to an improved mechanism for composing, sharing, disseminating, and consuming various types of information among interconnected users.

The shared information is perceived by a consuming user (consumer). The consumer perceives information conveyed through various forms of media objects, including text, icons, voice, audio recordings, pictures, or videos. Descriptions of one or more forms of media objects may be combined in a data object, which the consumer accesses over the network. The data object may contain additional "metadata" information which is not typically observed by the consumer, but may instead define parameters useful in conveying information to the consumer, such as user identifiers, data beaters, data types, or data interpretation resources, as described below. Metadata may combine one of more specialized categories of metadata, such as a "meta identifier", a "meta keyword", and so on.

The consumer experiences a virtual reality, stimulated by a plethora of multimedia information. As opposed to the real world, where social interactions often depend on physical characteristics of the communicator, in a virtual social network the composing user (composer) is limited only by his ability to stimulate others through the sharing of information. Composers on networks are currently able to perform social functions which are analogous to their real world counterparts, such as to compose mail, to write diaries, or to publish original works or compositions of other works, all in electronic form over the network.

Modem computer networks are typically hierarchical transmission networks with multiple layers of transmission protocols. A transmission network is a system that allows two or more transceivers to exchange data, whereas a transmission protocol is a sequence of standard interactive steps that facilitate the exchange. Typically, the lowest level protocols are more concretely tied to the interaction of physical circuitry, whereas higher levels of protocols are more abstract to facilitate higher level processing at an algorithmic level. For example, in the vernacular "the web," also known as "the Internet," has become shorthand for a multi-layer computer communications system, which combines higher level protocols for access, mid-level protocols, such as a means of locating resources available on the network using a system of uniform resource locaters (URLs), and low-level hardware transmission control protocol/internet protocols (TCP/IP) which control the exchange of large, uneven blocks of data by breaking them into smaller, standardized packets. The network user seeks improved means to gather information, compose new information, and share that information with other users, without the burden of managing lower-level protocols or learning new programming languages.

In the context of a computer network, a "server" is physically one or more computer systems connected to the network, containing a set of one or more central processing units (CPUs) and support circuitry operative to execute a sequence of one or more processor instructions to process data. A sequence of one or more processor instructions for a particular purpose or application is known as an application program. Physical circuitry in a server typically includes one or more CPUs, a plurality of interfaces for inputting application programs and data, a plurality of memories for storing programs and data, a plurality of interfaces for outputting programs and data, and a plurality of transceivers for exchanging data and commands with other servers. Data may be organized in storage to facilitate efficient processing, such as by storing the data in a "database" consisting of a collection of data indexed by relationships between the various forms of data contained therein. A "virtual server" consists of a set of one or more servers interconnected hierarchically to perform high-level functions as combined functions of several servers under central control.

Functionally, a server executes a sequence of low-level CPU commands to complete instructions for processing data. A server typically accepts instructions and executes commands for a multitude of remote "clients". The instructions may include, but are not limited to, instructions to store or retrieve data, to modify, verify or erase data, or to reorganize data. The server may also initiate instructions for other network-attached devices. For example, a virtual "music server" might maintain a database to locate a library of musical compositions. The music server might receive commands to store new songs or retrieve old ones from a number of clients. Further, the music server might send commands to other devices on the network, e.g., to disseminate the musical database among various subservient servers, such as a "jazz server," a "hip-hop server," a "classical server," and so on, to register paying user requests in a "billing server," to verify the identity, preferences, and access privileges of a user in a "registration server" and so on. The "music server" may therefore also be a client of other servers. Practitioners of the art will recognize that servers and clients are abstract interactive devices controlled by software instructions, whose interaction protocols may be flexibly defined. A "client" as used herein may include functionally to process information and programs, as well as to issue commands. Similarly, a "server" as used herein may include functionally to initiate commands to user device(s) and other servers as well as to respond to instructions.

Similarly, a database should not be construed to be a single physical collection of data. As used herein, a database is an abstract collection of data. Said data may be stored physically within a single or multiple servers, within attached physical device(s), network attached device(s), or user devices(s). Similarly, an application program should not be construed to be a single physical collection of commands. As used herein, an application program is an abstract collection of computer-readable commands, which may be physically executed, in whole or in part, within a single or multiple servers, within attached physical devices(s), within network attached device (s), or within user device(s), A network user utilizes a number of application programs to create or consume content on the network. Example application programs include a "browser," an "e-mail client," a "blog client," and a "media object player."

A browser is an application program that is generally intended to display multimedia content. The browser typically displays the multimedia content in a virtual book format, typically displayed as one or more individually framed "web pages," along with means for navigating to other related web pages. A web page is typically a two-dimensional image appearing as an individual page of information including one or more types of associated media objects. A web page may also be associated with consumer perceived audio output. Data for web pages is often described in a format known as a Document Object Model (DOM).

The multimedia content may be directly perceived on the web page or may be indirectly accessible. Content on the page may be directly perceived by including displayed images, videos, or a media object player rendered within the image of the page. Examples of indirect access include access to an audio recording through background music, access through an auxiliary page or pop-up window, access through an auxiliary program such as Microsoft's Windows Media Player®, or access provided through a link to another page. Many web pages incorporate one or more "hot links." The hot link enables a consumer to access another web page or another application by pointing to and clicking on the hot link using a computer input pointing device such as a mouse. Consumers typically have the ability to reject the web page or additional media offering(s) through controls in the browser user interface, such as by clicking on a "close box" using the mouse to remove or "close" a displayed window image.

A network user may also become a composer to create new web pages. The DOM for a web page is typically stored in a data file using a common programming language, such as Hyper Text Markup Language (HTML). The composer may compose the web page directly by creating a description in the common programming language, or may compose the web page indirectly using an application program to combine text descriptions and other media into a page description in HTML or another suitable language. A composer may further combine one or more web pages to create a "website." A website may be self-contained, in that it consists solely of web pages created for that site and a means for navigating among the contained web pages. More commonly, a website contains a combination of composer-generated content as well as links to other content or applications on the web. Typically, the composer may review a new web page or website composition on his computer using his browser. The composer may also disseminate the new web page or website to other users on the network by publishing his page To use the web server to publish a page, the composer typically registers with a service-provider, such as Yahoo-!Geocities®. Composers who wish to enhance a web page with media content other than text typically complete a cumbersome process of locating and incorporating the content. When the web pages are published, the composer and service-provider may be exposed to legal liability for incorporating copyrighted or inappropriate content. Although the composer or service-provider could potentially license the copyrighted content, transaction costs may be too high for individual composers.

In addition, the composing user may not have the same access privileges as a consuming user. For example, the composer may have a subscription service to an internet service-provider, which licenses the downloading of music files. A consumer on the network accessing the composition may not have the same subscription-based privileges. The composer seeks to provide additional media content for any consumer, without the burden of determining consumer access privileges.

A popular form of web page for individual users is an online diary, known as a "web log" or "blog." The blog composer is also known as a "blogger." The blogger typically provides a textual description of personal experiences and shares them with other network users of the network in a sequence of blog pages. Although the blogger desires to enhance blog pages with related media content to create a multimedia experience for the blog consumer, he or she faces similar difficulties to those encountered by other web page composers. As a result, bloggers typically use the services of a standardized blog composition and display service-provider, such as Yahoo! 360° Blog®. Standardized blog composition services give composers limited control over their compositions. These limitations may include limited access to embeddable media, limited varieties of page composition, and limited access to embeddable media object players. Composers generally are limited to locating related media content on their own. In addition, blog displays on a sen-ice-provider are typically limited to one scrollable page per user, are accessible only to other users of the service-provider, and the service-provider controls the overall composition of the website.

Art e-mail client typically has the option of accessing electronic mail through a specialized e-mail client application or a general-purpose web browser application. Either application allows a user to compose mail messages as well as to consume messages. E-mail messages typically consist of text and optionally include one or more instances of user-attached media objects. The e-mail messages are typically stored in data objects including text and optionally HTML. To use e-mail, the network user typically registers with an e-mail service-provider, such as Yahoo! Mail®. The service-provider typically maintains a virtual e-mail server for its various service customers' use with e-mail client software. The e-mail server provides a facility for e-mail clients to authenticate themselves and interact with the appropriate subservient server. Users who wish to enhance their e-mails with media objects other than text typically complete a cumbersome process of locating, attaching, and uploading the additional content for the enhanced e-mail.

As mentioned previously, a consumer may use an auxiliary program to perceive media objects, such as the Windows Media Player®, available from Microsoft Corporation of Redmond, Wash., the RealPlayer® from RealNetworks, Inc. of Seattle, Wash., or the QuickTime® player from Apple Computer Inc. of Cupertino, Calif. Each of these players is able to process a variety of data file formats describing media objects. Example data file formats include JPEG, TIFF, or PIC format data files for photographs, WAV, MP3, or AIFF format data files for audio recordings, and AVI, MPEG, or H.264 format data files for video recordings. The consumer typically locates and accesses a media object described in a suitable format for his or her auxiliary program. If the media object is not directly available in a suitable format, the consumer may convert the media object file format to a suitable format using conversion software, such as Harmony Technology™ from RealNetworks, Inc.

When the media object is a recording, the typical media object player has a user control interface akin to that of a tape recorder, with user controls to play, pause, fast forward, reverse, and so on. The consumer is typically able to process one media object at any time in the player. If the user is currently perceiving a music video of a particular artist but decides instead to seek a similar music video of a different artist, for example, the consumer must perform, a number of steps to pause or end the currently playing video, locate the related video, and wait while an initial portion of the video is accessed by the auxiliary program. The consumer seeks more media object choices, automated methods of locating those choices, and access to located choices more immediately.

SUMMARY

A media enhancement mechanism for users of computer networks is described. A network composer accesses the services of an enhancement service-provider to obtain one or more embed codes that can be used to enhance a data object, containing at least one reference to a media object, by providing additional media objects. The service-provider additionally provides an enhancement mechanism for insetting the embed codes in data objects. When the composer supplies a data object description, the enhancement mechanism modifies the description to produce an enhanced data object description, with additional computer code contained as metadata in the modified description. When consumers access an enhanced data object, the embed code is operative to relate one or more referenced media objects in the data object to one or more additional media objects, and to push the additional media object offerings to the attention of the consumer. An appropriate representation of each additional media object offering is provided. Representations of the additional media object offerings are combined in one or more immediate alternatives as they become available to the consumer, and thereby create more opportunities for immediate consumption on the network.

DESCRIPTION OF THE DRAWINGS

FIG. 5 is an example of software code that can be embedded in a data object.

DESCRIPTION OF EXAMPLE EMBODIMENT(S)

The following embodiments and aspects thereof are described and illustrated in conjunction with systems, apparatuses and methods which are meant to be exemplary and illustrative, not limiting in scope. In various embodiments, one or more of the above-described problems have been reduced or eliminated.

The following description sets forth numerous details to provide a thorough understanding of various aspects of the present invention. It will be apparent to those skilled in the art, however, that the present invention may be practiced without these specific details. In other instances, algorithms for processing data and symbolic representations of algorithmic operations are the terms used by those skilled in the art to most effectively convey the substance of their work to others skilled in the art. An algorithm, as used herein, is a sequence of operations leading to a desired result, said operations requiring physical manipulations of physical quantities. Usually, though not necessarily, these quantities take the form of a sequence of electrical signals representing binary numbers which can be stored, transferred, combined, compared, and otherwise manipulated.

The present invention also relates to apparatus for performing the operations herein. This apparatus may be specially constructed for the required purposes, or it may comprise one or more general-purpose computers selectively activated by one or more computer programs to achieve the required results. Such a computer program may be stored in any suitable computer-readable storage medium. A computer-readable storage medium includes any mechanism for storing or transmitting information in a form that is usable by a machine, such as a general-purpose computer.

The algorithms and displays presented herein are not inherently related to any particular computer or other apparatus. Various general-purpose systems may be used in accordance with the teachings herein, and it may prove expedient to construct more specialized apparatus to perform the algorithm operations. The required structure for a variety of these systems may appear from the description below. In addition, the present invention is not described with reference to any particular programming language. Those skilled in the art will appreciate that a variety of programming languages may be used to implement the teachings of the invention as described herein.

Figure 1:
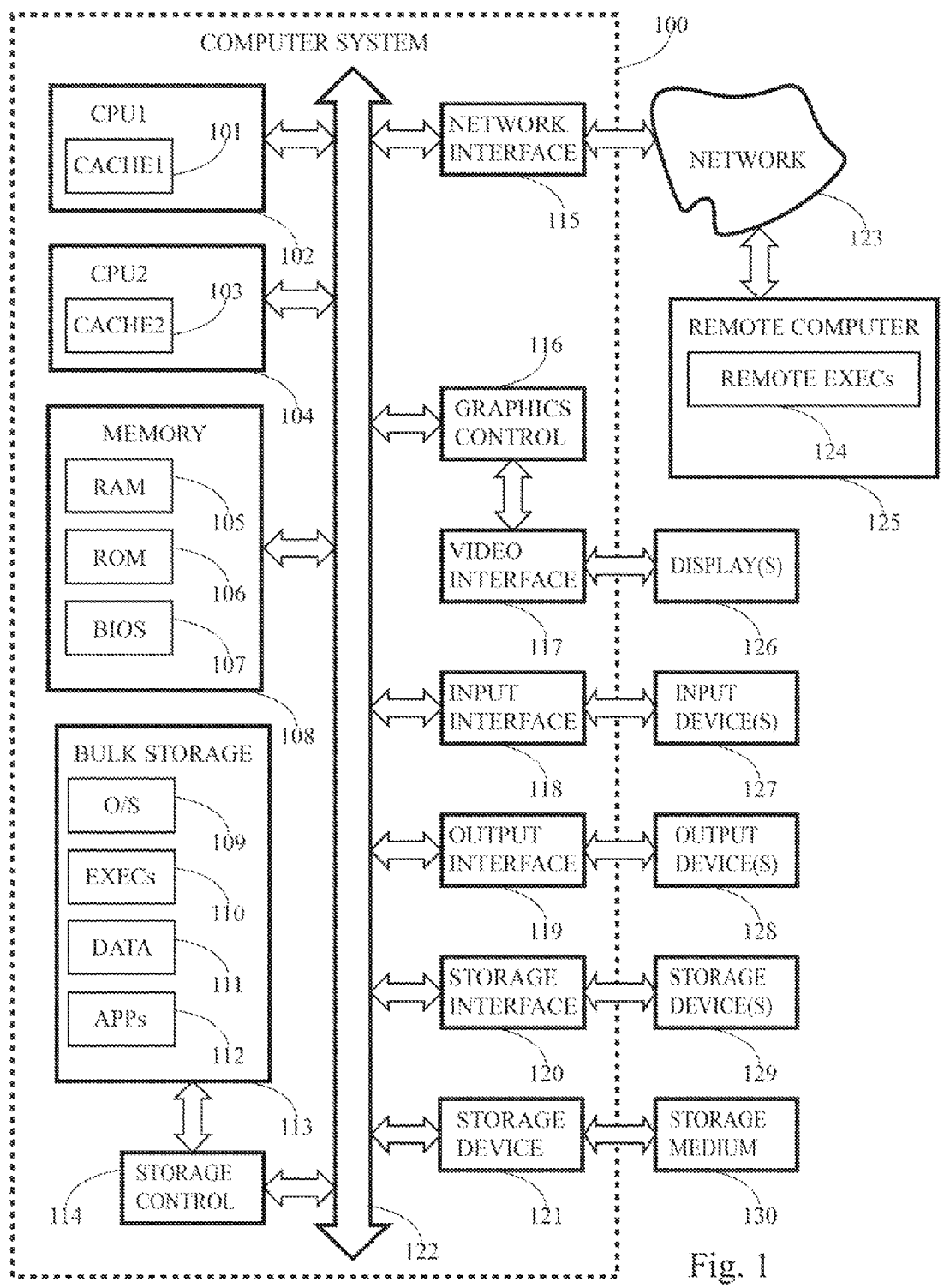
FIG. 1 is a block diagram of computer system architecture.

Server systems described herein can be implemented by a variety of computer systems and architectures. FIG. 1 illustrates suitable components in an exemplary embodiment of a general purpose computer system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computer system environments or configurations.

The invention may be described in the general context of computer-executable instructions, such as program modules, being executed, by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system, for implementing the invention may include a general purpose computer system 100. Computer system 100 accesses one or more applications and peripheral drivers directed to a number of functions described herein. Components of the computer system 100 may include, but are not limited to, a CPU or central processing unit 102, a system memory 108, and a system bus 122 that couples various system components including the system memory 108 to the processing unit 102. As used by those skilled in the art, a signal "bus" refers to a plurality of digital signal lines serving a common function. The system bus 122 may be any of several types of bus structures including a memory bus, a peripheral bus, and a local bus using any of a variety of bus architectures. By way of example, and not limitation, such architectures include Industry Standard Architecture (ISA) bus. Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

An operating system manages the operation of computer system 100, including the input and output of data to and from applications (not shown). The operating system provides an interface between the applications being executed on the system and the components of the system. According to one embodiment of the present invention, the operating system is a Windows® 95/98/NT/XP/Vista operating system, available from Microsoft Corporation of Redmond, Wash. However, the present invention may be used with other suitable operating systems, such as an OS-X® operating system, available from Apple Computer Inc. of Cupertino, Calif., a UNIX® operating system, or a LINUX operating system.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, random access memory (RAM), read-only memory (ROM), electrically erasable programmable ROM (EEPROM), flash memory or other memory technology, compact-disk ROM (CD-ROM), digital versatile disks (DVD) or other optical disk storage, magnetic tape cassettes, magnetic tape, hard magnetic disk storage or other magnetic storage devices, floppy disk storage devices, magnetic diskettes, or any other medium which can be used to store the desired information and which can accessed by the computer system 100.

Communication media may also embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared, cellular networks, and other wireless media.

The system memory 108 includes computer storage media in the form of volatile and/or nonvolatile memory such as read only memory (ROM) 106 and random access memory (RAM) 105. A basic input/output system 107 (BIOS), containing the basic routines that help to transfer information between elements within computer system 100, such as during start-up, is typically stored in ROM 106 and other nonvolatile storage, such as flash memory. Additionally, system memory 108 may contain some or all of the operating system 109, the application programs 112, other executable code 110 and program data 111. Memory 108 typically contains data and/or program modules that are immediately accessible to and/or presently being operated on by CPU 102. Optionally, a CPU may contain a cache memory unit 101 for temporary local storage of instructions, data, or computer addresses.

The computer system 100 may also include other removable/non-removable, volatile/nonvolatile computer storage media. By way of example only, FIG. 1 illustrates a bulk storage 113 that reads from or writes to one or more magnetic disk drives of non-removable, nonvolatile magnetic media, and storage device 121 that may be an optical disk drive or a magnetic disk drive that reads from or writes to a removable, a nonvolatile storage medium 130 such as an optical disk or a magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. Bulk storage 113 and the storage device 121 may be connected directly to the system bus 122, or alternatively may be connected through an interface such as storage controller 114 shown for bulk storage 113. Storage devices may interface to computer system 100 through a general computer bus such as 122, or may interconnect with a storage controller over a storage-optimized bus, such as the Small Computer System Interface (SCSI) bus, the ANSI ATA/ATAPI bus, the Ultra ATA bus, the Fire-Wire (IEEE 1394) bus, or the Serial ATA (SATA) bus.

The storage devices and their associated computer storage media, discussed above and illustrated in FIG. 1 provide storage of computer-readable instructions, executable code, data structures, program modules and other data for the computer system 100. In FIG. 1, for example, bulk storage 113 is illustrated as storing operating system 109, application programs 112, other executable code 110 and program data 111. As mentioned previously, data and computer instructions in 113 may be transferred to system memory 108 to facilitate immediate CPU access from processor 102. Alternatively, processor 102 may access stored instructions and data by interacting directly with bulk storage 113. Furthermore, bulk storage may be alternatively provided by a network-attached storage device (not shown), which is accessed through a network interface 115.

A user may enter commands and information into the computer system 100 through the network interface 115 or through an input device 127 such as a keyboard, a pointing device commonly referred to as a mouse, a trackball, a touch pad tablet, a controller, an electronic digitizer, a microphone, an audio input interface, or a video input interface. Other input devices may include a joystick, game pad, satellite dish, scanner, and so forth. These and other input devices are often connected to CPU 102 through an input interface 118 that is coupled to the system bus, but may be connected by other interface and bus structures, such as a parallel port, a game port or a universal serial bus (USB). A display 126 or other type of video device may also be connected to the system bus 122 via an interface, such as a graphics controller 116 and a video interface 117. In addition, an output device 128, such as headphones, speakers, or a printer, may be connected to the system bus 122 through an output interface 119 or the like.

The computer system 100 may operate in a networked environment using a network 123 to one or more remote computers, such as a remote computer 125. The remote computer 125 may be a terminal, a personal computer, a server, a router, a network PC, a peer device or other common network node, and typically includes many or all of the elements described above relative to the computer system 100. The network 123 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 124 as residing on remote computer 125. It will be appreciated that the network connections shown are exemplary and other means of establishing a communications link between the computers may be used.

Collectively, these elements are intended to represent a broad category of computer systems, including but not limited to general purpose computer systems based on a member of the "x86" family of CPUs manufactured by Intel Corporation of Santa Clara, Calif., and the x86-compatible CPUs manufactured by Advanced Micro Devices (AMD), Inc., of Sunnyvale, Calif., as well as any other suitable processor. Of course, other implementations are possible. For example, the server functionalities described herein may be implemented by a plurality of server sub-systems communicating over a backplane.

Various components of computer system 100 may be rearranged, deleted,. or augmented. For example, system bus. 122 may be implemented as a plurality of busses interconnecting various subsystems of the computer system. Furthermore, computer system 100 may contain additional signal busses or interconnections between existing components, such as by adding a direct memory access unit (not shown) to allow one or more components to more efficiently access system memory 108. Computer system 100 further comprises storage device(s) 129 coupled to storage interface 120 coupled to bus 122.

As shown, CACHE1 and CPU1 are packed together as "processor module" 102 with processor CPU1 referred to as the "processor core." Alternatively, cache memories 101, 103, contained in 102, 104 may be separate components on the system bus. Furthermore, certain embodiments of the present invention may not require nor include all of the above components. For example, some embodiments may include a smaller number of CPUs, a smaller number of network ports, a smaller number of storage devices, or a smaller number of input-output interlaces. Furthermore, computer system 100 may include additional components, such as one or more additional central processing units, such as 104, storage devices, memories, or interfaces. As discussed below, in one implementation, operations of one or more of the physical servers described herein is implemented as a series of software routines executed by computer system 100. Each of the software routines comprises a plurality or series of machine instructions to be executed by one or more components in the computer system, such as CPU 102. Initially, the series of instructions may be stored on a storage device, such as bulk storage 113. However, the series of instructions may be stored in an EEPROM, a flash device, or a DVD. Furthermore, the series of instructions need not be stored locally, and could be received from a remote computer 125 or a server on a network, via network interface 115.

Figure 2:
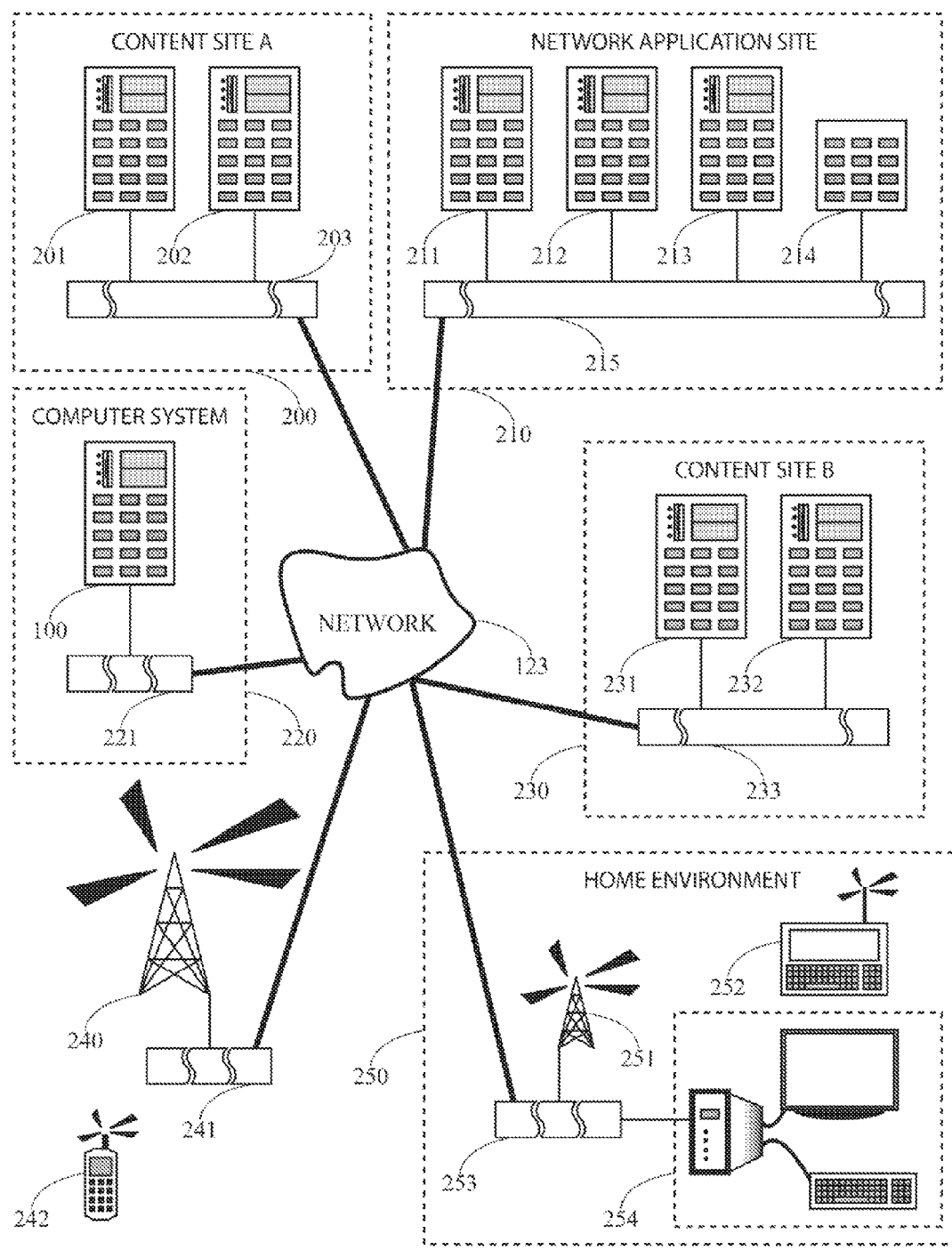
FIG. 2 is an illustration of an example network environment.

FIG. 2 illustrates computer system 100 placed in an example \vide area network environment, such as the Internet. Network cloud 123 generally represents one or more interconnected networks, connecting computer system 100, a plurality of network sites, such as 200, 210, 220, 230, 240, and 250, and a plurality of client devices, such as 242, 251, 252, and 254. Network cloud 123 may include TCP/IP based wide area networks, private networks wireless networks, satellite networks, cellular networks, paging networks, and the like. Client systems, such as portable device 242, portable computer 252, and personal computer 254 are operably connected to the wide area network environment through an internet service provider (not shown), a cellular provider 240, a wireless provider (not shown), a local wireless network 251, and/or a local wired network 241 and/or 253.

Computer system 100 is contained within the network site 220, where one or more computer systems, such as computer system 100, are connected to a local area network and router 221. The router 221 manages local computer communication traffic in network site 220 and interconnects with network cloud 123. Router 221 also functions to translate one or more local area network addresses in network site 220 to provide one or more unique corresponding wide area network addresses in order to facilitate communication between computer systems in network site 220 and other computer systems on the wide area network.

FIG. 2 illustrates a number of network service provider sites, including content site A 200, content site B 230, and network application site 210. The described invention may operate with one or more content providing sites. Although FIG. 2 illustrates the provider sites as separate local network sites, the functionality of each site may be combined with other sites. Further, a function for a particular site may be performed in a distributed computing environment by one or more computer systems at remote sites. Further still, the functionality represented by each depicted site may be further separated into a plurality of sub-function sites. In addition, implementations of the invention may operate in network environments that include multiples of one or more of the individual sites or subsystems of sites described herein. Implementations of the invention may also operate in network environments where one or more of the systems or sites described herein has been eliminated.

Content aggregation sites are represented by content site A 200 and content site B 230 in FIG. 2. Content is stored as digital data objects, which may include media objects or executable code objects. Content site A 200 is a network addressable system that allows users to access media objects supplied by one or more users. In one implementation, content site A 200 may be a media object aggregation or sharing system, such as Yahoo! Flickr® photo sharing site, and similar variants. Content site A 200 comprises one or more physical server systems 201, 202, implemented using an architecture such as that of computer system 100, and containing or connected to one or more bulk storage systems, such as that of bulk storage system 113, or a network attached storage device (not shown), and a local area network and router 203. The one or more physical servers allow users to upload and download media objects. In one implementation, the functionality hosted by the one or more physical servers may include web or HTTP servers, FTP servers, and the like.

Content site B 230 is a network addressable system that allows users to access content supplied by one of more content suppliers (not shown). Content site B 230 comprises one or more physical server systems 231, 232 containing or connected to one or more bulk storage systems (not shown), and a local area network and router 233. The one or more physical servers 231, 232 allow the service provider (not shown) to store media objects and users to download media objects.

Network application site B 210 is a network addressable system that allows users to access one or more executable code objects supplied by one or more service providers (not shown). Network application site B 210 comprises one or more physical server systems 211, 212, 213 containing or connected to one or more bulk storage systems, shown as network-attached storage device 214, and a local area network and router 215. Executable code objects may include code to be executed on a user device as well as code executed within a server system, such as server 212. An example of an executable code object is an informational web site where users request and receive identified web pages and other content over the network cloud 123. The executable code object may also be a posting forum, where users may submit or otherwise configure media objects to be perceived by other users. The executable code object may also be a social network application, such as a chat engine or e-mail host. The executable code object may also be a blogging or web-posting application, allowing users to configure and maintain personal web pages. One or more executable code objects may also combine to form a content distribution application that displays available media objects and transmits them to users. Examples of network application sites include Yahoo! Musk Engine®, Apple iTunes®, and podcasting servers.

In media object aggregation or sharing systems, such as the Yahoo! Flickr® photo sharing site, media objects are typically contained in data objects which also contain metadata related to the media object. For example, a data object containing a media object may also contain one or more meta keywords to identity related media objects. A photo sharer may upload a photo to a photo sharing site, and consider the photo related to a set of keywords, such as "artists," "musicians," "drummers," and "teen-idols." The photo sharer may further configure the media object by combining the media object with the set of related meta parameters in a data object.

A content creator on the network may incorporate the shared photo in a composition by various means. The photo may be copied into the composition by downloading the photo description file and inserting it into the composed data object. In one embodiment of the invention, a content site, such as Flickr®, may supply an embed code that makes a media server request for the media object when the embed code is accessed and executed by a user application, such as a browser. As discussed below, the media object access code may be obtained from the content site, and copied/pasted into the composed data object. In a second alternative embodiment, an enhancement code mechanism, described below, inserts the embed code in the composed data object. In a fourth alternative embodiment, the embed code for the photo may include the media object access code as well as instructions to make one or more server requests for additional related media objects, obtained by execution of a media server executable code.

Figure 3:
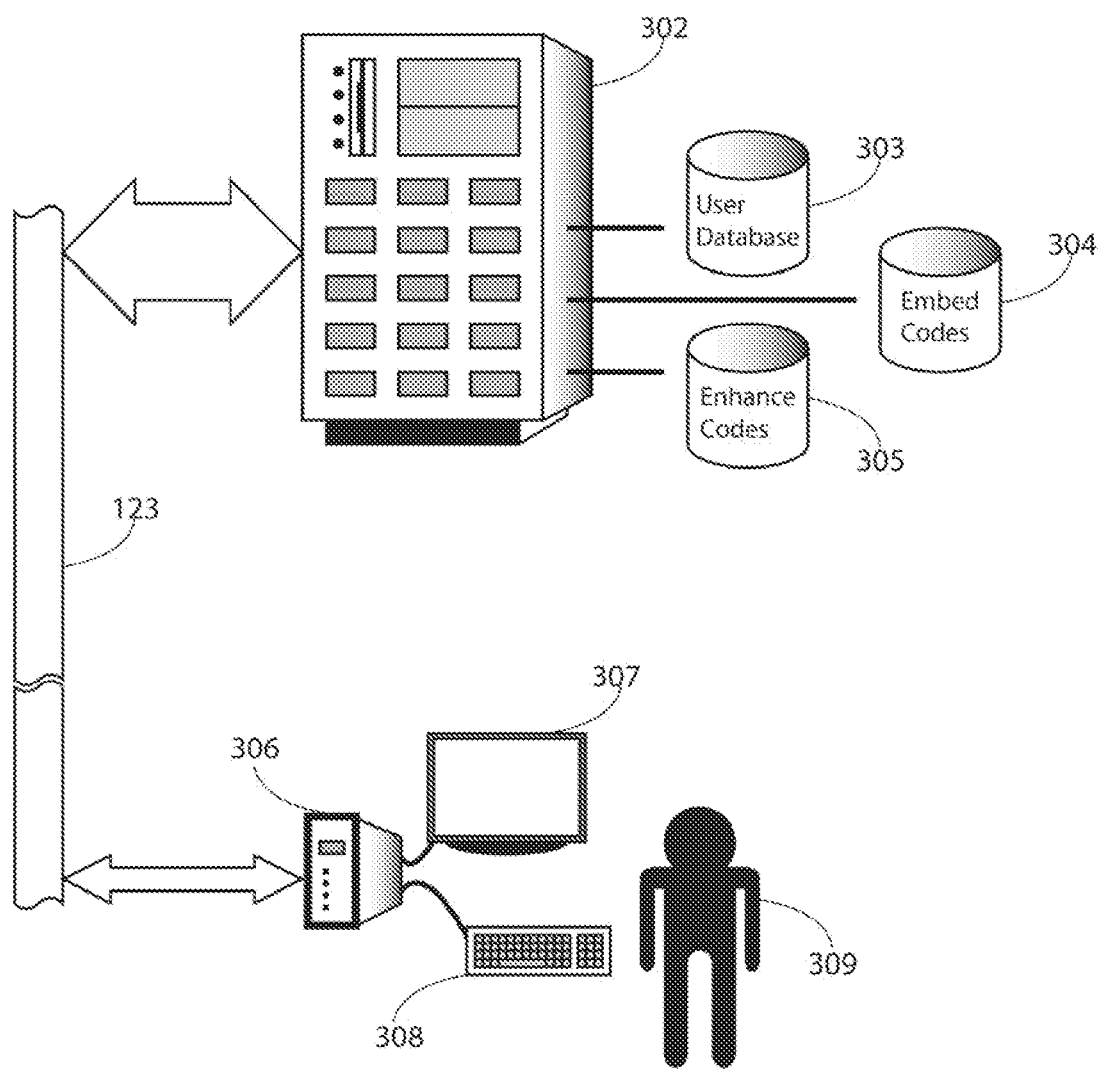
FIG. 3 is an illustration of a client-server system for service registration.

FIG. 3 illustrates a client-server system, where an enhancement service-provider registers a plurality of users. User 309 is able to communicate over the network cloud 123 through the use of a network client application, such as a web browser. User 309 typically has a network access device 306, such as a computer, a text input device 308, such as a keyboard, and observes a two-dimensional display 307, such as a monitor. The enhancement service-provider operates a virtual registration server 302 over the network cloud 123 which maintains a registration website (not shown), a database of user identities 303 and a plurality of databases of computer software code 304, 305 to enable network users to access an enhancement service. Server 302 is operative to register new users and to supply appropriate software code. Server 302 implements a registration process which may include one or more of (1) determining whether the user is a new or a returning user, (2) authenticating the returning users, (3) storing a set of user preferences, (4) retrieving a set of user preferences, and (5) enabling use of the enhancement service by providing one or more embed codes. The embed codes are operative to provide an enhanced data object composition and rendering service operating within the context of a general-purpose client application, such as a web browser. Optionally, server 302 may be operative to provide one or more user device software codes, referred to hereinafter as an "enhancing code." The enhancing code is operative to functionally replace, augment, or modify a user application program, such as a browser, to enable one or more additional enhancement steps in die composition or rendering of media objects.

Figure 4:
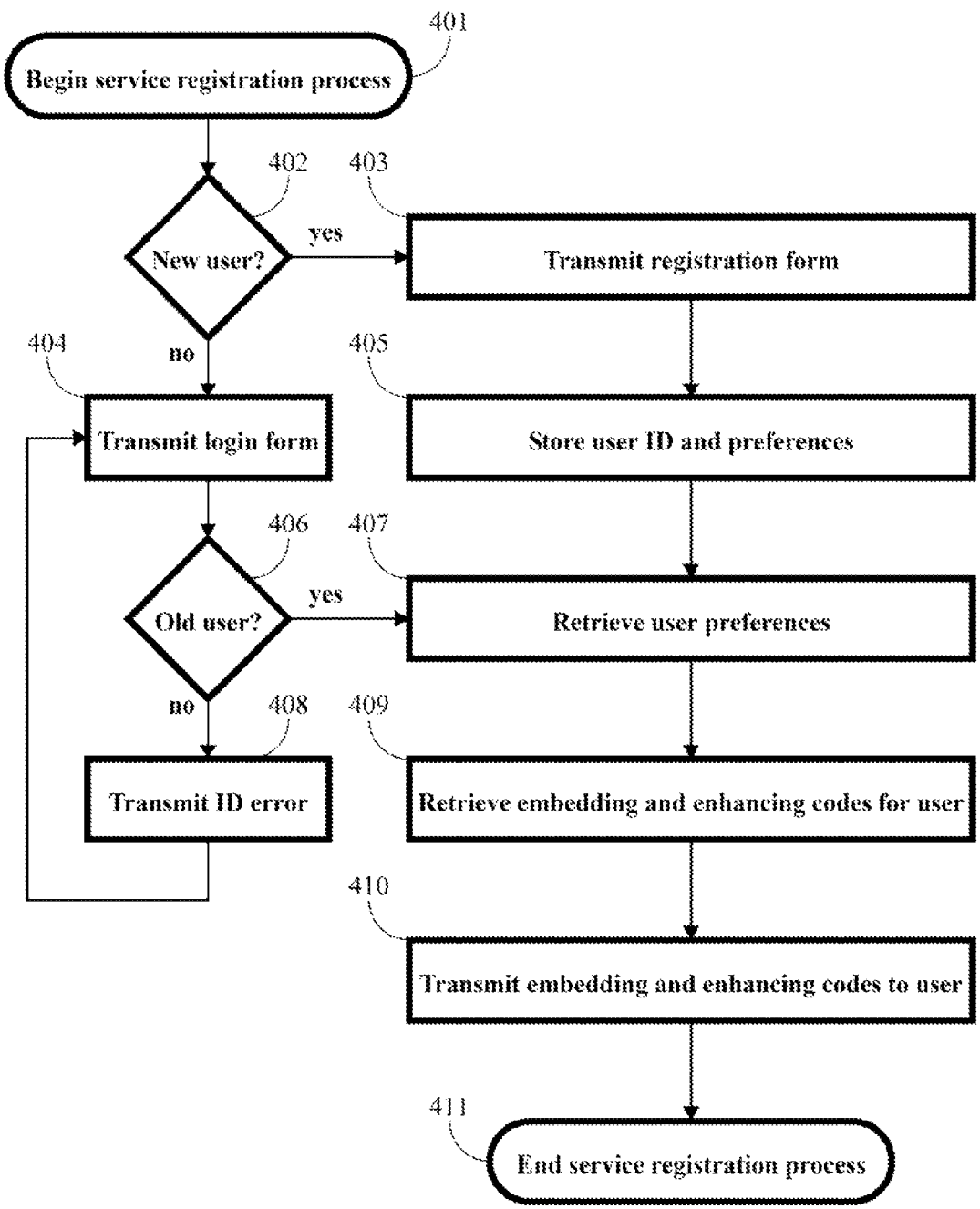
FIG. 4 is a flowchart illustrating an example service registration process.

FIG. 4 is a flowchart representing an example service registration process consisting of a number of software steps. Components in a service-provider's registration server 302 execute computer-readable instructions to implement the software steps. The registration process begins at 401 and ends at 411. The registration process scans user input to determine whether a user accessing the server is a new user or an old returning user in step 402. With new users, the registration process scans entries on an online registration form in step 403 to determine and store a unique user identifier (ID) in the user database 303 in step 405. Optionally, the registration server executes commands to store user preferences.

The registration process authenticates returning users by scanning input to an online login form 404 to determine if the login ID resides in the user database 303 in step 406. If not, an ID error is transmitted and processing continues at step 404. Once a user has been properly identified, user preferences are retrieved from storage in step 407. The user preferences may relate to one or more parameters or attributes of the operation of the enhancement mechanism. For example, the user preferences may include parameters that bias or control selection of photographic media objects over video/audio media objects. In step 409, registration server 302 retrieves, and in some instances, dynamically generates a set of appropriate embed and enhancing codes, and transmits the codes to a user device 306 in step 410. The output of the service registration process is operative to provide a media enhancement mechanism, where the user may insert the embed code in underlying content, such as an HTML page. For dynamically generated code, the server may dynamically add a meta user identifier to the code, as well as one or more user preferences. These meta parameters can be used to bias the selection of media, as described below, to allow for composer personalization.

The enhancing code is operative to facilitate the enhancement mechanism for composer applications. The composition-enhancement mechanism consists of inserting one or more embed code sections in association with one or more existing media object references contained in data objects, such as HTML pages. In one implementation, the output of the registration process is limited to a set of embed code sections, which the user can copy and paste into data object descriptions. In an alternate implementation, an enhancing software code module may assist the user in inserting embed code sections during composition of data, objects. The enhancing software code module may be provided in various forms, as described below, fire enhancing code is operative to facilitate the composition-enhancement mechanism by assisting the user in inserting embed code in the data object by providing additional functionality to a composer application.

Embed code may take many forms. For example, the embed code may be high-level computer language source code, such as HTML code, or low-level computing machine instructions. Embed code may also include or link to one or more scripts, such as JavaScript, expressing functions that are included from HTML code. One or more sections of the embed code may contain a script, or calls to retrieve a script, that dynamically generates one or more aspects of the enhanced data object or other content provided when the embed code is executed.

FIG. 5 is an example of embed code that can be included in a data object, such as an HTML page. The script language and type of source code is identified in the first line. The script is used to retrieve and render a media object on a displayed page. In this example, various data describing the media object to be displayed are listed in a header section. The header data optionally may include various parameter identifiers, including a user identifier, height and width of the displayed object in pixels, and a meta keyword associated with the media object. "eucalyptus." The script also contains a related object preference for "audio." As discussed, some of these meta parameters, such as keywords and preference parameters, may he included in the embed code as a result of explicit commands from a user. The embed code further identifies an additional remote set of computer instructions in the form of an external script for retrieving and rendering the object, provided by a network resource locater (http://ypn-js.yahoo.com/js/enhancer.js).

When a consumer accesses an enhanced page, script functions can interact with the Document Object Model (DOM) of the page to perform one or more tasks. Scripts may also be used to make service requests to remote servers alter an HTML page has loaded. These requests can obtain new information or data, as well as load or launch additional applications, e.g., media object players, content viewers, application plug-ins, or software codes. Script code can merge with the DOM of the underlying page so that one or more additional media objects are displayed or otherwise rendered on the page. Alternatively, the script code may initiate one or more additional pages or other rendering for the additional media object(s). When embed code is inserted into an HTML document and subsequently accessed by a client application, the client application may retrieve and execute the script. The script, optionally using the parameter values in the embed code, may initiate service requests to one or more remote servers to retrieve and render one or more media objects that enhance the underlying content of the page. For example, the script, when executed, may cause the client application to query media server 702, described below, to retrieve one or more media objects, and then cause a client application to render the retrieved media object(s).

Figure 9:
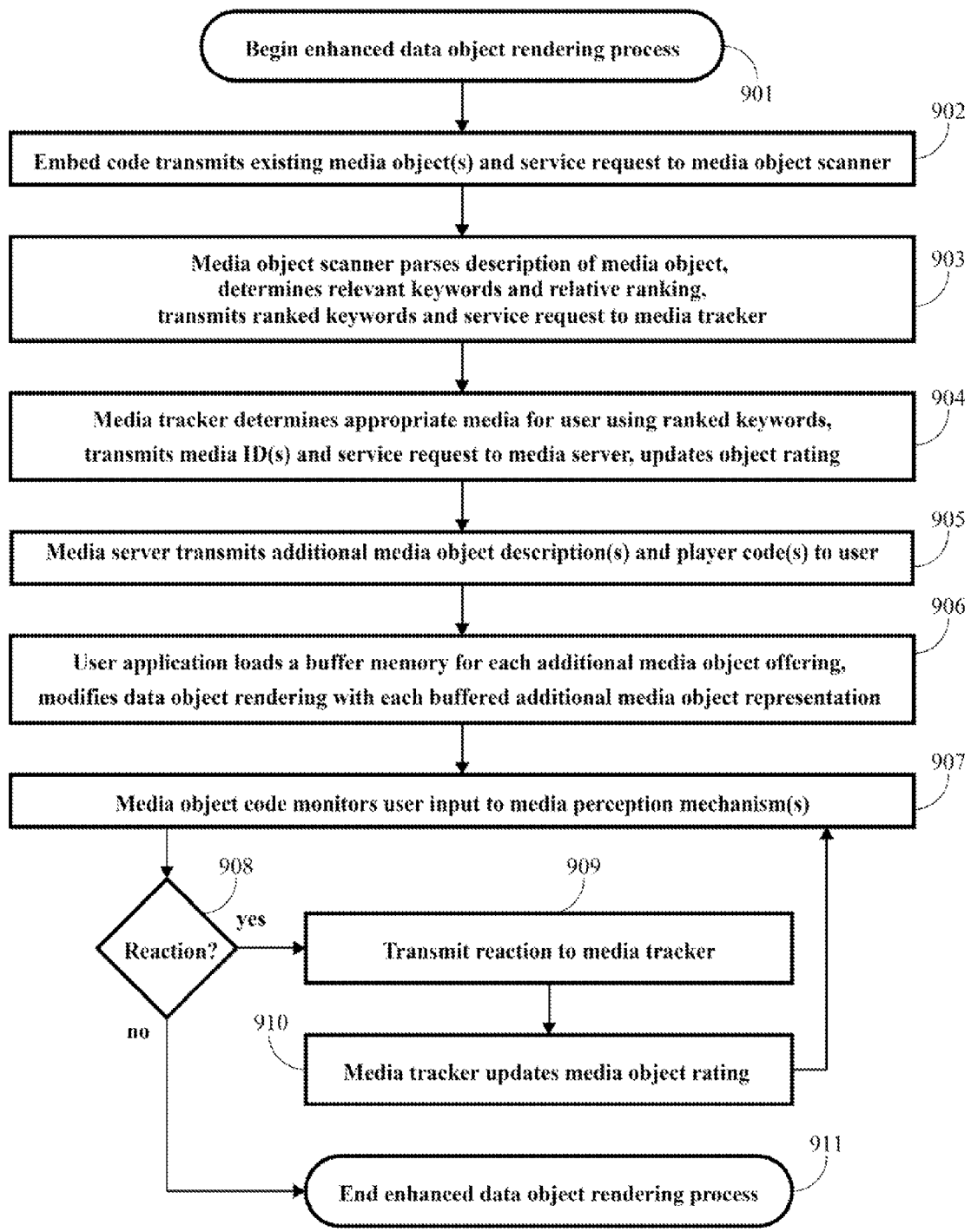
FIG. 9 is a flowchart showing an example enhanced rendering process.

In addition, the script may access the DOM of the underlying HTML page to extract and process information. For example, as FIG. 9 illustrates, the script may process the data of the underlying HTML page to extract media objects and related text of the page and provide it to media server 702. The script could also perform additional operations. For example, the script could process the data of the HTML page, filtering out extraneous information such as "the", "a", "and", and the like, and transmit only the relevant media selection information when querying for media objects for page enhancement. In addition, the script may access the DOM to identify the server (identified, in one possible implementation, by uniform resource locater) that hosts the underlying HTML page.

Another way to detect underlying or theme information of a data object is to read the metadata in the data object in an automated way. In an alternative implementation, the script may extract one or more meta parameters that may be useful, for example, to select one or more media objects. For example, a photographic media object may include additional information about the photograph in one or more "meta tags" in the metadata. An example meta tag includes <meta name="keywords" content="photography, digital photography, camera phones, camera">. A mechanism for automatically retrieving information in the data object is known as a page-scraping mechanism. The page-scraping mechanism retrieves text in metadata as well as user composed text. Retrieved text is used to determine a page theme using technology for determining semantic meaning. Metadata as provided by the user or a media object supplier would be valuable to understand the theme of the data object. Using this information and the text content of the page, a semantic engine may select one or more relevant topics from a dictionary, and may select one or more relevant media objects to enhance the page.

In addition, the enhancement mechanisms disclosed may employ a categorization tool to characterize data object text or metadata. Categories can be associated with one or more keywords. For example, a meta tag containing "photography" and text describing the Grand Canyon may be characterized as a category of photographs that came from Arizona and may be associated with a keyword entitled "ArizonaPics." As another example, a user sharing a media object representing a photograph of the performing artist Sheila E might associate the media object with a keyword entitled "Prince," the name of another performing artist who often employs Sheila E.

In addition, the enhancement mechanisms disclosed may employ mechanisms for consumer personalization. When a network information consumer accesses a data object using a browser, for example, script code may access consumer identifiers in a consumer "cookie" or some other consumer data file The cookie or data file is a data object containing one or more meta parameters specific to the consumer. By accessing the consumer's meta parameters, an embed code may optionally include instructions to bias the selection of media to include consumer preferences and/or consumer access privileges in a service request.

Figure 6:
FIG. 6 is an illustration of a photographic media object and a thumbnail representation of the media object.
Figure 6:
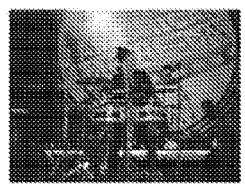

After registration, embed code can be provided to the user as displayed text, as a displayed HTML page, or may be stored in a text or other data file. After the user has been provided displayed embed code, the user may save the embed code in a text or other data file, or load the embed code in a buffer with a "copy" operation, such as by highlighting the text and entering "Ctrl-C" to copy the highlighted text in a buffer in the Windows® operating environment. The user may insert the embed code into one or more data objects, such as HTML, pages in a variety of circumstances. For example, when configuring a blog post, a user may paste the embed code into the HTML code of the blog page. Blog posting (and other network, application) interfaces typically include an "edit HTML" tab that allows a user to directly edit the HTML code of the blog post. The embed code may be incorporated into a variety of data objects. Indeed, a blog post represents one of many possible forms of social media in connection with which the content-embedding code can be used. For example, the embed code may be incorporated into personal pages on social networking sites, such as MySpace.com, Facebook, Yahoo! 360, and the like. The embed code may also be used in other contexts. For example, the embed code may be entered into a thread on a public forum site. Still further, a webmaster or other user may include the content-embedding code into one or more pages of a web site, such as a commercial news site (e.g., cnn.com, zdnet.com, etc.), FIG. 6 illustrates two media objects contained within a data object from Flickr®. The first is an example media object and the second is a compressed representation of the media object. The media object, accessible on the network in a data object file, is in a JPEG format description of a photograph of a musical performing artist known, as "Sheila E." The data object file also references a compressed representation of the photograph, which is also in JPEG format. The two photographs are shown in FIG. 6, where a media object rendered in the form of a larger photograph of the musical artist is illustrated, along with a compressed version of the media object. Although details in the smaller photograph are more difficult to perceive, the smaller photograph by itself may suggest or represent a larger photo of Sheila E to her devoted fans. The compressed photograph is known as a "thumbnail" version.

Figure 7:
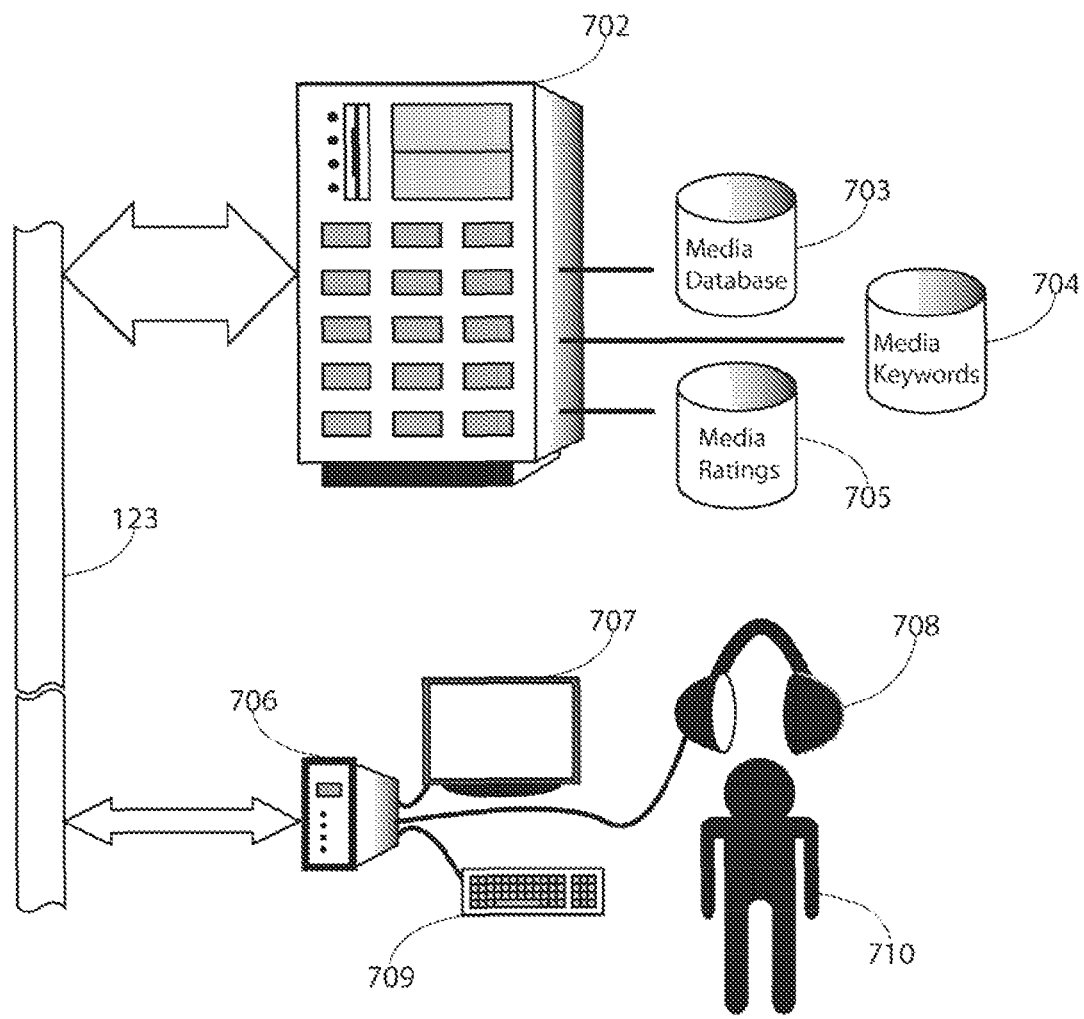
FIG. 7 is an illustration of a client-server system providing enhanced data objects.

FIG. 7 illustrates a client-server system over network cloud 123, where an enhancement service-provider supplies one or more additional media objects to enhance a data object for a network information consumer. Assume for didactic purposes that a composer has created a blog entry including at least one media object and embed code as described above. As a result of the processes described herein, a consumer 710 perceives the original media content and additional media content. The additional media content is rendered as one or more visual objects on a visual display 707 and/or one or more audio passages produced by an auditory transducer, such as a pair of headphones 708.

The additional media content is rendered by execution of software on a user device 706. Keyboard 709 shown in FIG. 7 is connected to user device 706. User device 706 executes embed code in the context of a user application, such as a web browser. The service-provider operates a virtual media server 702 which maintains a database of media object descriptor files 703, a database 704 to reference relationships between media objects using media-describing keywords, and a database for media object preferences 705. The media object descriptor files may include one or more of descriptions of audio files, descriptions of photographs, descriptions of videos, and/or other media object descriptors. Server 702 is operative to transmit one or more additional media objects to the user device 706 in response to one or more embed code service requests. The additional media objects are transmitted in the form of one or more data descriptor files and, optionally one or more software code modules for perceiving an additional media object.

Figure 8:
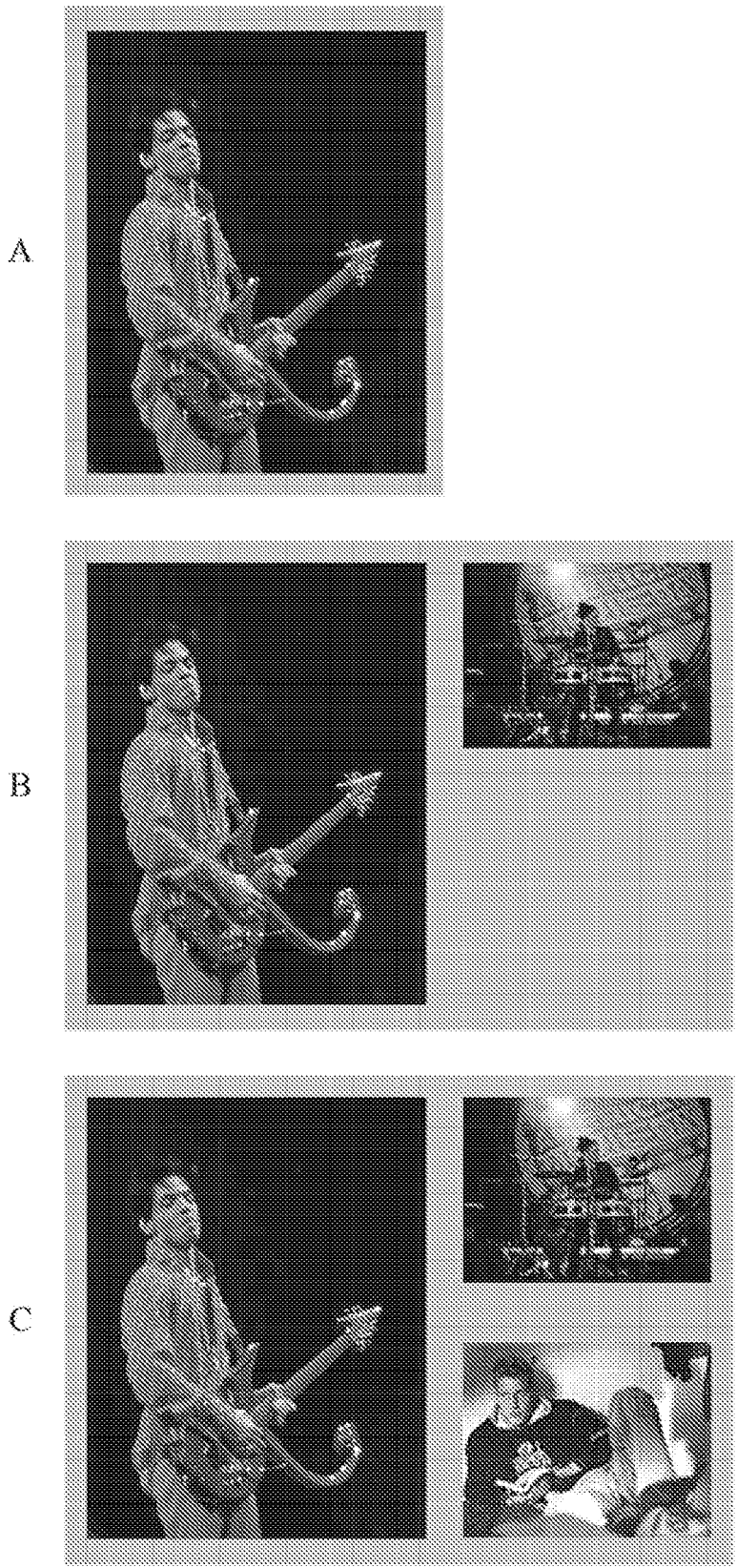
FIG. 8 is a sequence of illustrations representing a consumer experience.

For example, a composer may create a data object containing a media object in the form of a description of an original photograph of a performing artist, Prince. The enhancement-service provider may locate an additional media object related to the original media object consisting of a photograph of performing artist Sheila E. User 710 may perceive a page where the original photograph is rendered, and the enhancement mechanism renders an additional media object consisting of a representation of the Sheila E photograph rendered as an alternative to the original photograph. The enhancement-service provider may further locate additional media objects related to the original media object, such as a photograph of another Prince, Prince Harry. As more alternative media objects become available to the consumer, representations of the additional media objects are rendered as consuming alternatives to the existing media object. This is illustrated in FIG. 8, which consists of three parts, labeled A, B, and C. Part A is an example display of the composer's original data object. Part B is an example of a modified display of the composer's original data object and a representation of a first additional media object offering after location of the first additional media object. Part C is an example of a further modified display of the composer's original data object and a representation of the first and a second additional media object offering after location of the second additional media object.

The user may perceive an additional media object in various representations. In one alternative, the entire media object is rendered, such as by providing an image of an entire photograph on a page on display 707. In a second alternative, a compressed version of the additional media object is rendered on the display. In a third alternative, a link to the additional media object is included on the display. In a fourth alternative, the additional media object is associated with a media object player control interlace rendered on the display. For example, an additional media object consisting of a photographic object may be displayed by a combination of these and other representations. As will be appreciated by those skilled in the art, these and various other means of display commonly create a perception of a representation of a photographic media object on a page.

In addition, user 710 may optionally be provided with one or more media object control interfaces to alter the display of the representation of the media object, such as by resizing or rejecting a displayed photograph using one or more user application interface controls. Alternatively, user 710 perceives the representation of the media object, and may optionally alter the representation using application interface controls to reject the representation or to view an alternative representation. User 710 may optionally initiate additional service requests indicated by one or more links, or by further interacting with the media object control interface.

For example, Part C of FIG. 8 may be associated with a photographic media object control interface operable through use of the user's pointing device, typically a mouse. By using the mouse, a user may identify an alternative media object by pointing at it, such as by pointing at the thumbnail of Sheila E. By further "clicking" with the mouse on the alternative object's display, the user may select a focus on the alternative media object instead of the original media object. In response, an embedded script might swap the two photos, replacing the larger Prince photograph with the larger Sheila E photograph and the Sheila E thumbnail with a thumbnail of the original Prince photograph. In a second alternate response, the Sheila E photograph thumbnail may expand to a larger photograph for concurrent consumption of the two photos. In a third alternate response, selection of the Sheila E thumbnail may result in the larger photograph of Sheila E taking center stage and initiating a search for new alternative media object offerings, consisting of media objects most closely related to Sheila E.

Furthermore, the representation of an alternative media object offering, such as the thumbnail of Sheila E, may link to an alternate type of media object as well. The alternative type of media object may be displayed with an alternative media object player control interface. For example, the thumbnail of Sheila E may be a hot link to a video object player pre-loaded with the beginning of a Sheila E music video. The additional media object player control interface may augment the original media object, or alternatively, may replace or modify the display of the original media object. For example, a media object player to display a photograph might have pertinent controls to crop, resize, or change the color in the photograph, whereas a video player might have pertinent controls to play, pause, fast forward, or rewind playing of the video, and a music player might have pertinent controls to play, pause, equalize, or adjust the volume of the music. In one embodiment, only those controls pertinent to the current media object selection are displayed. In an alternate embodiment, all user controls appear, but only those controls pertinent to the current media object selection are highlighted. In a third alternate embodiment, a media object control interface optionally appears by a "right-clicking" on the object. The right-clicking is performed by the user by using a right click button on the user mouse.

As a consequence of these alternative representations and the user application interface controls, user 710 may not be able to view an entire additional media object on the page at all times. A particular space on the page may be reserved for a representation of the media object or the media object control interface. When user 710 does not perceive the additional media object, the space may be available to display one or more other media objects. For example, user 710 may be done viewing an additional media object consisting of a photograph in a certain space on the page, and the space dedicated to all or part of the photographic image may-be optionally replaced with one or more media objects provided by server 702.

As a second example, a consumer 710 in FIG. 7 may perceive a data object containing an original music video. The consumer may perceive a corresponding video player with a control interface contained on a displayed page. The video player is operative to process a video object descriptor file, a video object data stream, or a title image to render a representation of the video. The consumer may be provided optional controls which may include a video player control interface to pause, play, rewind, fast-forward, or reject the video media object. The enhancement mechanism renders a representation of an additional media object consisting of an alternative video object. An indication of the alternative video object offering is rendered on video output of display 707 and/or through audio output of transducer 708. In one embodiment of an enhanced media object player interface, a thumbnail representing the alternative video is rendered on the video player interface. In a second alternate embodiment, the photographic title image or another compressed representation of the video is rendered in another place on the consumer display. The consumer perceives the compressed representation of the alternative video, and may optionally view the uncompressed alternative video or reject the compressed representation on the display. In a third alternate embodiment, a link to the video is rendered on the page, and the user may optionally perform a control action to perceive the video. If the user does not perceive the video at all times, or the video data stream (if any) ends, the space on the page dedicated to all or part of the video player may be optionally replaced with other media objects provided by server 702.

FIG. 9 is a flowchart representing an enhanced rendering process, which begins 901 and ends 911. As discussed above an enhanced rendering process may be initiated when a network consumer accesses a data object, such as a blog, having an embed code section inserted by the page composer or an assisting enhancement mechanism. In FIG. 9, the enhancement process is initiated in step 902 when a client application, such as a browser, consumes the embed code (possibly downloading a script or other code module) and transmits a service request and all or some of the reference to an existing media object to the media server 702. The server request may include metadata in the embed code as well as metadata to identify the network consumer.

In FIG. 9, a media object scanner function is operative in step 903 to perform one or more of (1) resolving ambiguities in the referenced media object, (2) associating the media object with a set of one or more likely media-identifying phrases, (3) associating one or more of the media-identifying phrases with one or more media-describing keywords, and (4) prioritizing the associated keywords by ranking each such keyword.

As described above, keywords for the referenced media object may be derived in various ways. The media object itself may be embedded along with pre-assigned meta parameters including media-identifying phrases or keywords. In one embodiment, the embed code scrapes these meta parameters in the media scanner function. Alternatively, the embed code associated with the referenced media object may be configured with media-identifying phrases or keywords. In an alternate embodiment, the embed code references a media object in a remote server in association with media-identifying phrases or keywords which may be remotely accessed by a script invoked by the embed code. Optionally, the media object input to the media scanner may contain media object scanner metadata with one or more preconfigured media-identifying phrases, keywords, or rankings.

The media object scanner function is further operative to forward ranked keywords and a service request to a media tracker function in step 904. As mentioned previously, the media object scanner function is a software routine that may be executed in whole or in part by executing instructions in a server system and by executing instructions for the remainder of the software routine (if any) in a user device, In FIG. 9, the media tracker function in step 904 is operative to determine one or more data objects in a virtual media database to associate with the ranked keywords. The media tracker function may additionally utilize preferences and/or access privileges of individual composers, service-providers, multiple users, and/or individual consumers to bias the determination of appropriate media. The various preferences may be stored in a media ratings database, such as 705 of FIG. 7. Optionally, the input to the media tracker function in step 904 may already contain predetermined media identifiers in metadata. The media tracker function is further operative to forward appropriate media identifiers and a service request to a media server, such as 702 of FIG. 7. Optionally, the media tracker function is operative to update the combined preferences of multiple users as described below.

In FIG. 9, the media server is operative to transmit one or more additional media objects in step 905 and, if necessary, one or more software code modules (such as a media object player) for perceiving that media to the user's device. The user's application, in conjunction with the embed code, renders an enhanced data object on the user's device including a representation of one or more additional media objects in step 906.

An important aspect of the invention is to enable the consumer to change the selection of a currently perceived media object to perception of an alternative media object in a seamless manner. If the consumer incurs a significant wait for the alternative media object, he or she is less likely to choose the alternative media object and more likely to limit consumption. For example, a consumer might currently perceive a Prince musical recording, and decide to switch to an alternate media object consisting of a Sheila E music video. When the media object consists of a time-sequence recording, the media object player must typically receive an initial portion of the recording in order to play the recording without stalling. In one example embodiment, the embed code therefore operates in the background, first preparing an alternative media object for immediate perception, and then offering that immediate perception to the consumer. A music video, for example, typically requires a different software codec and uses a different media object player than those used by musical recordings. In the example embodiment the embed code downloads the appropriate media object player code if needed for perception of the alternative media object before offering the alternative media object to the consumer.

Further, for particular media objects, there is additional switching speed advantage in downloading a sufficient buffer of initial media object data. For example, a video player rendering a video data stream typically maintains a buffer to receive packets of the video data stream. The packets are received at irregular intervals using a TCP/IP Internet protocol, but are typically consumed at more regular intervals by a video codec. The video data buffer is operative to average the rate of received packets and maintain a constant stream of data to the video codec. The amount of data in the buffer is monitored to prevent underflow or overflow. In one embodiment, a pre-buffering of the initial video data stream is performed to ensure that the buffer does not empty before a video data stream can be established. If the consumer selects the Sheila E music video, for example, the alternative media object data buffer already contains enough of the initial portion of the music video to enable immediate perception of the beginning of the video. While the initial pre-buffered portion of the video plays, the enhanced media object player establishes a video data stream for the remainder of the video object data.

In FIG. 9, the embed code optionally incorporates additional functionality to monitor a user reaction to the enhanced media in steps 907 to 910. The reaction may be an explicit action of the user, or it may be an implicit action. For example, the associated media to be displayed on an enhanced page may be a music video, rendered as a media object player control panel which is displayed on the enhanced page, showing the video title image and interface controls for the media object player. A user may implicitly rate the media by ignoring the media object player or by playing some portion of the video, or the user may explicitly rate the video selection in response to a request initiated by the embed code. Optionally, the embed code may be operative to input explicit ratings or to derive implicit ratings based on the reaction of the user to the media object player in step 908. Optionally, the embed code is operative, in conjunction with the media tracker function and the user application, to adaptively adjust the rating preferences of multiple users by transmitting a contributing rating preference in step 909 to the media tracker function. The media tracker function updates combined user rating preferences in step 910.

As discussed above, the operations of inserting embed code in underlying data objects, such as HTML pages, may be facilitated and/or partially automated with the aid of one or more enhancing code modules, such as a client-side browser toolbar or plug-in. The client side application may access embed code stored locally or stored remotely on a server. In addition, the client side application may be operative to automatically login to registration server 302 and retrieve updated versions of embed code.

Figure 10:
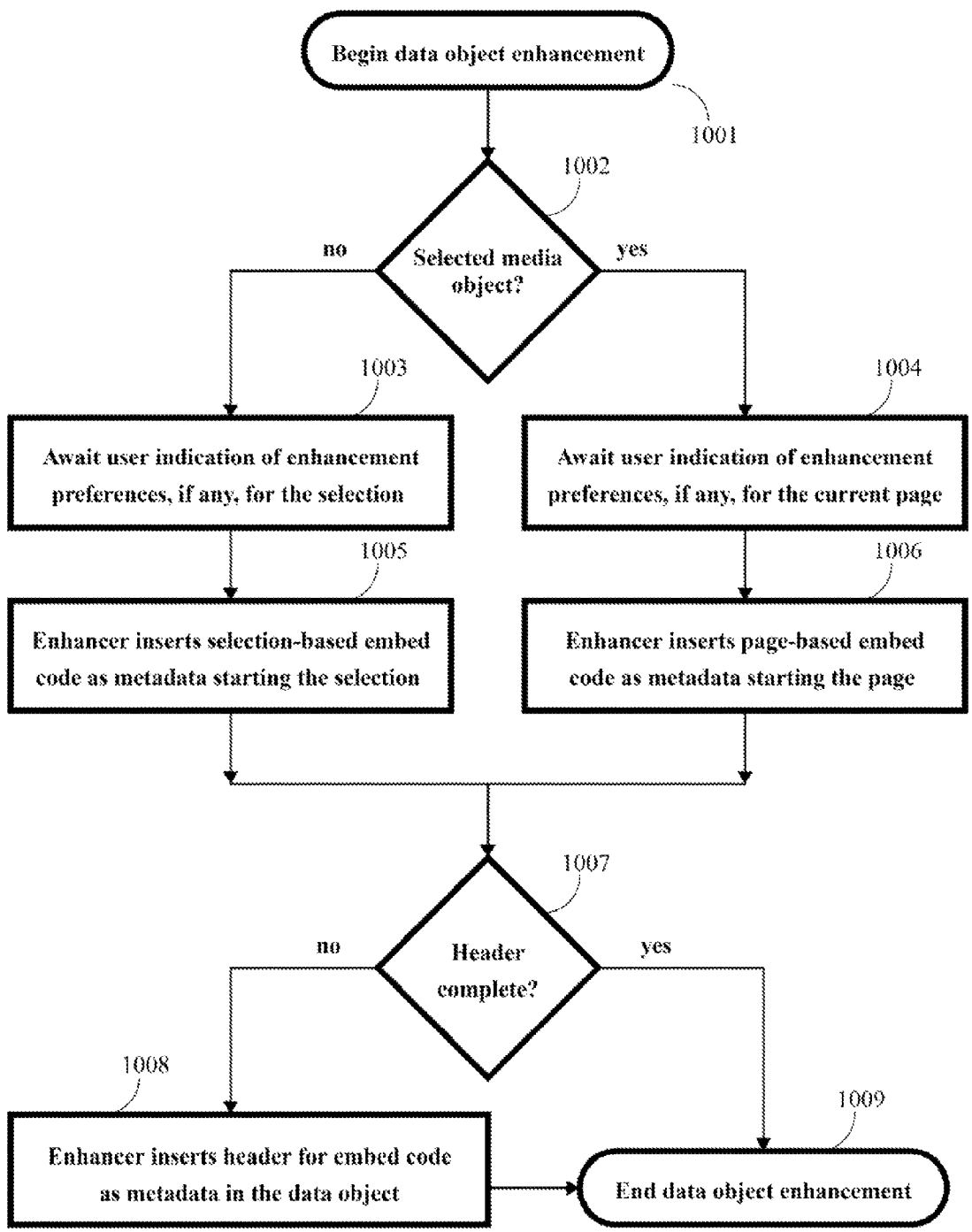
FIG. 10 is a flowchart providing an example media enhancement process.

FIG. 10 is a flowchart representing an example media enhancement process for a user who composes data objects. The process begins 1001 and ends 1009. The process begins in response to a user application interface control action, such as clicking on an "Enhance" button displayed on a toolbar of a user application, or by locating "Enhance" on a pull-down user application menu of "Tools." The example enhancement process depends on the nature of the objects to be enhanced in step 1002. If the user indicated a selection of a subset of the existing media objects on a page display prior to his or her enhancement action, only that selection is enhanced; otherwise, the entire currently observed page is enhanced. In either case, a software routine, such as step 1003 or 1004, displays a list of possible user preferences (if any) in this enhancement process. The user selected preferences are encoded as a header for the embed code. The embed code augments a data object description as metadata contained in an enhanced data object description file. If a media object has been selected, the embed code with header is inserted at the beginning of the selection in step 1005; otherwise the embed code with header is inserted at the beginning of the page in step 1006. Software routines that are common to a plurality of embed codes are contained in a data object section of metadata. The enhancer checks that the appropriate header for the embed code is included at the header of the enhanced data object in step 1007, and if not, inserts the appropriate header code in step 1008.

For example, a user might compose a blog entry describing a concert as follows. "The cheerleading squad gathered at Adrian's, so we could carpool to the Prince concert. We arrived at Shoreline Amphitheatre at 7 PM, but the place was already a madhouse. The warm-up was Sheila E, and Prince didn't come out on stage until 9 PM. He was great, and appeared in a big cloud of purple smoke. The encore was Purple Rain." The user may additionally locate a music video of Prince and a picture of Sheila E to include in the blog posting. In a selection enhancement mode, the user may indicate a sequence of desired enhancements by effectively performing part of the media object scanner and media tracker functions. The user may indicate desired media objects to be enhanced, such as by highlighting the Prince video and indicating that a related music video is desired, or by selecting the phrases "Prince concert," "Purple Rain," "encore," and the Sheila E photograph and indicating a related musical recording is desired, and so on. The user implicitly rates the importance of the various selections, or may indicate their relative importance explicitly through indication of user preferences.

In a full-page enhancement mode, the data object enhancement mechanism automatically processes the data object description to determine a number of media objects to be inserted on the enhanced page. The media object scanner function may process the original media objects and accompanying metadata, and associate each media object with one or more keywords. Considering the text page as a whole to be highly related to musical artists and to an artist named Prince in particular, the media scanner function may additionally increase the rank of keywords related to musical performers, and may additionally increase the rank of keywords associated with the artist Prince. The media tracker function selects media objects related to the ranked keywords. The media tracker's selection may be based on a number of preferences, such as one or more most-popular objects in a set of global preferences, one or more highest-paying media objects in a set of service-provider preferences, one or more media objects personally preferred by the text composing user, and so on.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method comprising:
   receiving, via at least one processor, a request for embed code for a user application with an application programming interface;
   generating, via the at least one processor, embed code comprising computer-readable instructions operative to:
   access one or more media object attributes of the data object containing the embed code and referencing at least one media object;
   interact with one or more remote server systems to retrieve one or more additional media objects associated with the one or more media object attributes, the embed code including one or more account attributes for identifying the one or more additional media objects; and
   render the one or more additional media objects within a context of the data object;
   transmitting, via the at least one processor, the embed code in response to the request;
   accessing, via the at least one processor, a content consuming entity identifier in the media object request resulting from execution of the embed code; and
   identifying, via the at least one processor, the one or more additional media objects to be associated with the one or more media object attributes of the data object, the one or more account attributes associated with the content consuming entity identifier, the identifying one or more media objects is biased by the one or more account attributes associated with the content consuming entity identifier.

2. The method of claim 1 further comprising:
responsive to receiving a media object request:
returning, via the at least one processor, one or more of the identified media objects in response to the media object request.

3. The method of claim 1 further comprising:
responsive to receiving a media object request:
invoking, via the at least one processor, one or more computer-readable instructions operative to:
access one or more pre-assigned meta parameters of the referenced at least one media object which are embedded in the data object;
access one or more preconfigured parameters of the embed code associated with the referenced at least one media object;
invoke media object access scripts to access remotely stored parameters associated with the referenced at least one media object;
combine the pre-assigned, preconfigured, and remotely stored parameters in a set of related media-identifying phrases; and
determine a set of keywords associated with the related media-identifying phrases in a keyword database; and
identify the one or more additional media objects associated with the one or more of the determined keywords in a media object database.

4. The method of claim 1 wherein one or more account attribute comprise user preference.

5. The method of claim 1 wherein the one or more account attribute comprise user access privilege information.

6. The method of claim 1 further comprising:
determining an identifier for a user associated with the request for embed code; and
adding the requesting user identifier as a content embedding entity' identifier to the embed code.

7. The method of claim 6 further comprising:
responsive to receiving a media object request,
identifying the one of more additional media objects to be associated with the one or more media object attributes of the data object, wherein the identifying the one or more additional media objects is biased by the one or more account attributes associated with the content embedding entity identifier; and
returning the one or more identified media objects to the client host in response to the media object request.

8. The method of claim 1 wherein the embed code further comprises computer-readable instructions to cause the host processor to define one or more media object player interfaces to be associated with the identified one or more additional media objects, and optionally retrieve one or more code modules corresponding to the one or more media object player interfaces.

9. The method of claim 2 further comprising:
accessing one or more media object ratings corresponding to one or more media objects;
and wherein the identifying one or more additional media objects is biased by the one or more media object ratings.

10. The method of claim 1 wherein the embed code is further operative to cause the host processor to:

access a script operative to cause the host processor to scan for the one or more media object attributes of the data object; and
transmit the one or more media object attributes to the remote server system.

11. The method of claim 1 wherein the embed code comprises HTML source code.

12. The method of claim 1 wherein the embed code contains JavaScript code.

13. The method of claim 2 further comprising:
processing the one or more media object attributes to determine one or more keywords associated with one or more related media objects;
rating the relative importance of determined keywords;
accessing one or more ranking attributes of the related media objects;
combining the rating and ranking attributes to determine a priority of the related media objects; and
using the priority of related media objects to identify the one or more additional media objects.

14. The method of claim 5 further comprising:
accessing one or more attributes of the consuming user identified in the media object request;
determining access privileges for the content consuming user from the one or more attributes of the consuming user;
determining media objects the consuming user has privilege to access; and
restricting selection of media objects to enforce the user access privileges.

15. A non-transitory computer-readable storage medium storing computer-readable instructions operative, when executed, to cause one or more processors to:
receive a request for embed code;
generate embed code into a data object, the embed code operative to:
access one or more media object attributes of the data object containing the embed code and referencing at least one media object;
interact with one or more remote server systems to retrieve one or more additional media objects associated with the one or more media object attributes, the embed code including one or more account attributes for identifying the one or more additional media objects; and
render the one or more additional media objects within the context of the data object;
access a content consuming entity identifier in the media object request resulting from execution of the embed code; and
identify the one or more additional media objects to be associated with the one or more media object attributes of the data object, the one or more account attributes associated with the content consuming entity identifier, the identifying one or more media objects is biased by the one or more account attributes associated with the content consuming entity identifier.

16. A method comprising:
storing, by a computing device, embed code comprising computer-readable instructions operative, when executed, to:
access one or more media object attributes of a data object containing the embed code and referencing at least one media object;
interact with one or more remote server systems to retrieve one or more additional media objects associated with the one or more media object attributes, the embed code including one or more account attributes for identifying the one or more additional media objects;

render the one or more media objects within the context of the data object;

access a content consuming entity identifier in the media object request resulting from execution of the embed code;

identify the one or more additional media objects to be associated with the one or more media object attributes of the data object, the one or more account attributes associated with the content consuming entity identifier, the identifying one or more media objects is biased by the one or more account attributes associated with the content consuming entity identifier; and storing, by the computing device, enhancing code comprising computer-readable instructions operative, when executed, to:

access one or more attributes of the data object; and embed, responsive to a received command, one or more sections of the embed code in the data object, wherein a data object file modifier operatively inserts the one or more embed code sections into the data object.

17. The method of claim 16 further comprising:

obtaining the embed code from a remote server: and modifying the embed code to incorporate one or more user enhancement preferences.

18. The method of claim 17 wherein one user enhancement preference comprises a media object type preferences.

19. The method of claim 16 wherein the user command identifies a selection of one or more media object attributes of the data object; and wherein the method further comprises modifying the embed code based on the selection of the one or more media object attributes.

20. The method of claim 19 further comprising extracting one or more keywords from the selection of one or more media object attributes, and modifying the embed code to include the one or more keywords.

* * * * *